United States Patent [19]
Birkenstock et al.

[11] 3,853,961
[45] Dec. 10, 1974

[54] PROCESS FOR THE PRODUCTION OF DICARBOXYLIC ACID ESTERS AND THE CORRESPONDING DICARBOXYLIC ACIDS

[75] Inventors: Udo Birkenstock, Homberg, Rathingen; Karlfried Wedemeyer, Cologne, both of Germany

[73] Assignee: Bayer Aktiengesellschaft, Leverkusen, Germany

[22] Filed: Dec. 26, 1972

[21] Appl. No.: 317,889

Related U.S. Application Data

[63] Continuation of Ser. No. 56,009, July 17, 1970, abandoned.

[30] Foreign Application Priority Data

Aug. 19, 1969 Germany............................ 1942016

[52] U.S. Cl...... 260/485 R, 260/78 R, 260/410.9 R, 260/468 R, 260/468 L, 260/514 R, 260/514 L, 260/533 R, 260/533 N, 260/537 R, 260/537 N, 260/666 B
[51] Int. Cl......................... C07c 69/34, C07c 55/02
[58] Field of Search........ 260/485 R, 537 R, 537 N, 260/533 R, 533 N

[56] References Cited
UNITED STATES PATENTS

| | | | |
|---|---|---|---|
| 2,680,758 | 6/1954 | Thomas...................... | 260/429 CY |
| 3,099,689 | 7/1963 | Cragg......................... | 260/429 CY |
| 3,185,718 | 5/1965 | Brown et al................. | 260/429 CY |
| 3,306,917 | 2/1967 | Shapiro et al............... | 260/429 CY |
| 3,417,130 | 12/1968 | Pruett et al................. | 260/485 R |

FOREIGN PATENTS OR APPLICATIONS

| | | | |
|---|---|---|---|
| 785,760 | 11/1957 | Great Britain.............. | 260/429 CY |
| 211,085 | 10/1957 | Australia.................... | 260/429 CY |

*Primary Examiner*—Lorraine A. Weinberger
*Assistant Examiner*—E. Jane Skelly
*Attorney, Agent, or Firm*—Burgess, Dinklage & Sprung

[57] ABSTRACT

Dicarboxylic acid esters are obtained by reacting 1 mol of a compound corresponding to the general formula

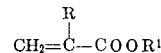

in which R represents hydrogen or a methyl group and $R^1$ represents hydrogen or a linear or branched lower alkyl radical is reacted with at most 1.95 mols of butadiene in the presence of a nickel catalyst which contains nickel in an oxidation state of less than +2 and which can be modified by donors, or nickel tetracarbonyl at a temperature in the range from about 50° to about 160°C, the unsaturated compounds formed are hydrogenated optionally without being isolated.

The new compounds obtainable by this process correspond to the general formula

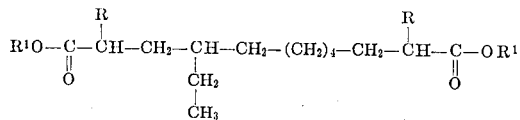

in which R represents hydrogen or a methyl group and $R^1$ represents an alkyl radical with from one to four carbon atoms or hydrogen.

The compounds obtainable by the process according to the invention can be reacted with diamines to form novel polyamides (this applies both as regards the known linear diesters or dicarboxylic acids and in particular as regards the novel branched diesters and corresponding dicarboxylic acids).

3 Claims, No Drawings

PROCESS FOR THE PRODUCTION OF DICARBOXYLIC ACID ESTERS AND THE CORRESPONDING DICARBOXYLIC ACIDS

RELATED APPLICATION

This application is a continuation of copending application Ser. No. 56,009 filed July 17, 1970, now abandoned.

This invention relates to a process for the production of dicarboxylic acid esters and of the corresponding dicarboxylic acids, and also to the compounds themselves some of which are new.

It has been found that α, β-dicarboxylic acid esters, and the corresponding dicarboxylic acids, with from 12 to 14 carbon atoms in the chair can be obtained by reacting a diolefin with an α, β-unsaturated compound in the presence of a catalyst, providing 1 mol of a compound corresponding to the general formula

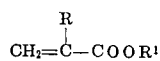

in which R represents hydrogen or a methyl radical and R¹ represents hydrogen or a linear or branched alkyl radical, is reacted with at most 1.95 mols of butadiene, optionally in the presence of on inert organic solvent and in the presence of a nickel catalyst (which contains nickel in an oxidation stage of less than +2 and which can be modified by donors) or nickel tetracarbonyl, at a temperature in the range from about 50° to about 160°C., the unsaturated compounds formed are hydrogenated, optionally without being isolated, and then, after they have been isolated, the resulting hydrogenated compounds are optionally hydrolysed to give the saturated dicarboxylic acids. Alkyl radicals (R¹) contain from one to four, and preferably one or four carbon atoms.

Processes for the catalytic oligomerisation of 1,3-dienes with acrylates are known. It is apparent from descriptions of these processes, that products containing only one acrylic acid ester molecule incorporated in them are formed during such reactions. Thus, the reaction of butadiene with ethyl acrylate in the presence of iron, nickel or cobalt catalysts lead to n-heptadiene acid esters (see DAS 1,192,640 and French Pat. No. 1,337,558). If, in another known process, these known reactions are carried out in the presence of nickel catalysts, only cyclohexane carboxylic acid esters and n-undecatriene acid esters are formed (see French Pat. No. 1,433,409).

The reaction of butadiene with ethyl acrylate in the presence of bis-(indenyl)-nickel-(II) is described inter alia in U.S. Pat. No. 3,417,130.

The present invention provides a method of synthesis which enables hitherto undescribed reaction products to be obtained from 2 mols of an acrylic or methacrylic ester and 2 mols of 1,3-butadiene. open-chain bifunctional oligomers are obtained in extremely high yields from 1,3-butadiene and acrylic or methacrylic esters in the presence of conventional nickel oligomerisation catalysts (with nickel in low stages of oxidation) which can be modified by electron donor or electron acceptor ligands. The process according to the invention is carried out with a molar ratio of acrylic ester or methacrylic ester to butadiene which is greater than 1:1.95. The reaction products formed consist of at least 2 molecules of 1,3-butadiene and 2 molecules of acrylic ester or methacrylic ester. Oligomers containing the starting components in a ratio of 2:2 are preferentially formed.

The novel compounds obtainable by the process according to the invention correspond to the general formula

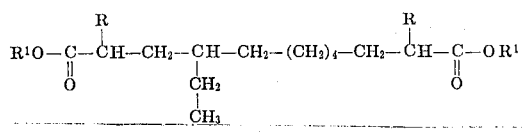

in which the radicals R and R¹ have the meanings given above.

Preferred novel compounds obtainable by the process according to the invention include those in which R represents hydrogen or a methyl radical and R¹ represents C₁₋₄ alkyl or hydrogen. Unbranched diesters and the corresponding unbranched dicarboxylic acids are obtained as secondary products in the process according to the invention.

Acrylic and methacrylic esters are used as olefinic components in the practical application of the process (Examples 36 to 38). The catalysts are synthesised on the basis of preformed nickel-(0)-olefin complexes [so-called "Complexes with bare nickel" (Agnew. Chem. internat. Edition 5, 151 (footnote) (1966)], from Ni(CO)₄ or from systems obtained by the reduction of divalent or low-valent nickel compounds (Example 19) in the broadest sense, with conventional reducing agents in the presence of an olefin or alkyne or other ligand which stablises the nickel in its low oxidation state. Catalytically active systems can also be obtained from nickel dialkyls, diaryls, hydrides and nickel components containing nickel in already partially reduced form. In addition, the catalysts can be modified by ligands in the broadest sense. Ligands of this kind include organic phosphines; phosphites; organic arsenic, antimony or bismuth compounds; phosphorus trihalides; aromatic or alphatic amines; sulphur or oxygen compounds; carbon monoxide (see French Pat. No. 1,337,558); 1,3-diolefins such as butadiene; and the acrylic and methacrylic esters. Preferred catalysts contain phosphites as ligands and are pure olefin complexes of nickel in the zerovalent oxidation stage (in which case the olefin ligands are intended to be interchangeable with the reaction components). Surprisingly, both the yield of diester mixture, based on the acrylic or methacrylic ester reacted, and also the reaction velocity can be influenced to a considerable extent by the choice of the ligand. The ligand required to modify the nickel catalyst is advantageously used in a minimum ratio to nickel of 0.05:1. There are no limits to the maximum ratios. It is preferred to use catalysts in which the molar ratio of ligand to nickel is 1:1. The amount of catalyst used is not critical and amounts from 0.1 to 2 percent by weight, based on the acrylic or methacrylic ester used. It is self-evident that the amount of catalyst can also be calculated on the amount of butadiene but also on the total amount of ester plus butadiene.

The reaction can be carried out in the usual organic solvents, although it is preferably carried out in the absence of solvents. The reaction can be carried out either continuously or in batches at a temperature of from about +50° to +160° C., preferably at a temperature of from 60° to 120° C., and most preferably at a temperature of from 70° to 100° C., at ambient pressure or at superatmospheric pressure in a pressure vessel, for example by combining the catalyst, in solution in acrylic ester or methacrylic ester, with butadiene. In some instances, it can be advisable to react the ester component in the presence of a suitable polymerisation inhibitor.

The isomer mixture formed during the reaction is converted by hydrogenation in conventional manner into a mixture of saturated diesters, which are subsequently isolated from the reaction mixture by conventional means, generally by distillation. Hydrolysis of the novel branched diesters thus obtained into the corresponding novel branched dicarboxylic acids is also carried out in conventional manner.

The compounds obtainable by the process according to the invention can be reacted with diamines to form novel polyamides (this applies both as regards the known linear diesters or dicarboxylic acids and in particular as regards the novel branched diesters and corresponding dicarboxylic acids). For example, 116 parts by weight of hexamethylene diamine and 258 parts by weight of the diacid obtained in accordance with Example 29 are dissolved in 249 parts by weight of water in the absence of oxygen and carbon dioxide. 100 parts by weight of this solution are transferred to an autoclave whose volume corresponds to 200 ccm. After flushing with nitrogen, the autoclave is closed and heated while stirring to 210°C., providing a vapour pressure of 19 atms. Whilst the internal temperature of the autoclave is slowly increased, the pressure is initially kept constant by venting. On completion of distillation with water, normal pressure prevails. Nitrogen is then passed through the polyamide melt formed while stirring for a period of 5 hours at 270°C. The melt is then forced with nitrogen through a valve in the bottom of the autoclave into water. After size reduction and drying, 48 parts by weight of a polyamide are obtained which softens at temperatures above 80°C. on a polished metal surface (Kofler bench), becomes tacky at 120°C. and melts at 135° to 145° C. Solution viscosity: $\eta$rel = 2.61 (1 g/l in m-cresol at 250° C.).

It is possible by virtue of the process according to the invention to convert the starting components in extremely high yields into the bifunctional oligomers described above.

It has also been found that formation of these oligomers is governed to a considerable extent by the influence of the donor present (Examples 7 to 18), by the ratio of acrylic ester to butadiene (Examples 1 to 6), by the reaction time (Examples 20 to 28) and by the reaction temperature (Examples 30 to 35).

EXAMPLE 1

Due to the high degree of sensitivity both to air and to moisture, it is best to carrry out all operations in an inert gas atmosphere. 16.48 mMols (4.53 g) of bis- (1,5-cyclo-octadiene)-nickel-(0) and 16.5 mMols (8.88 g) of tri-(o-phenyl-phenyl)-phosphite, dissolved in 929 mMols (92.9 g) of ethyl acrylate, are introduced at +20° C. into a 0.7 litre capacity autoclave. 1254 mMols (67.7 g) of 1,3butadiene are then introduced and the reaction mixture is left to react for 18 hours at +80° C. under the pressure automatically attained. The reaction mixture is left to cool, the unreacted 1,3-butadiene is blown off and the reaction mixture is weighed. Its unreacted ethyl acrylate content is determined, followed by hydrogenation with Raney nickel in ethanol by the conventional methods at a hydrogen pressure of 200 atms. and at a temperature of +100° C. Reduction is finished when no more double bond components can be detected by infra-red spectroscopy. The hydrogenated product is worked up by distillation in a column. The fraction which accumulates at b.p 130°–170°C./0.1 Torr contains the diester mixture enriched to at least 90 percent. Concentration to 99.8 percent can be achieved by fine distillation. To determine the yield, the hydrogenated product is roughly cut into fractions whose composition is determined by gas chromatography.

The following are obtained in the present Example:

| | |
|---|---|
| cyclooctane | 14.12 g |
| cyclohexane carboxylic acid ethyl ester | 3.33 g |
| cyclodecane carboxylic acid ethyl ester | 22.11 g |
| undecane acid ethyl ester | 14.55 g |
| diester mixture consisting of n-tetradecane diacid diethyl ester and 4-ethyl dodecane diacid diethyl ester | 61.14 g |

The diester mixture consists of 7.5 percent of n-tetradecane diacid diethyl ester and 92.5 percent of 4-ethyl dodecane diacid diethyl ester.

For a conversion of 675 mMols of ethyl acrylate (72.7 percent) the yield of the diester mixture is 57.5 percent.

All the following Examples are carried out in accordance with Example 1.

The following abbreviations are used in the following Examples:

| | |
|---|---|
| ACE | = ethyl acrylate |
| BD | = 1,3-butadiene |
| Ni(COD)$_2$ | = bis-(1,5-cyclooctadiene)-nickel-(0) |
| TPPP | = tri-(o-phenylphenyl)-phosphite |
| diester | = mixture of n-tetradecane diacid diethyl ester (n-diester) and 4-ethyl dodecane diacid diethyl ester (i-diester) |
| n-diacid | = n-tetradecane diacid |
| i-diacid | = 4-ethyl dodecane diacid |

The characteristics of the i-diester (measured on a 99% pure diester) are as follows:

molecular weight 314; refractive index $n_D^{30}$ 1.4420; density $D_4^{20}$ 0.9482; boiling point 117° – 119°C./0.1 Torr.

EXAMPLES 2 – 6

Influence of the ACE/BD ratio upon diester formation:

| Example No. | 2 | 3 | 4 | 5 | 6 |
|---|---|---|---|---|---|
| Temperature [°C] | 80 | 80 | 80 | 80 | 80 |
| Time [h] | 11 | 19 | 8 | 8 | 12 |
| reaction mixture | | | | | |
| Ni(COD)$_2$ | 3.85 g | 3.74 g | 2.75 g | 5.5 g | 5.5 g |
| TPPP | 7.55 g | 7.31 g | 5.38 g | 10.76 g | 10.76 g |
| ACE | 80 g | 310.5 g | 105.0 g | 198.0 g | 200.0 g |

Continued

| Example No. | 2 | | 3 | | 4 | | 5 | | 6 | |
|---|---|---|---|---|---|---|---|---|---|---|
| BD | 43.2 | g | 135.0 | g | 36.0 | g | 58.0 | g | 54.0 | g |
| ACE:BD ratio | 1.0 | | 1.25 | | 1.57 | | 1.84 | | 2.0 | |
| reaction products | | | | | | | | | | |
| cyclooctane | 8.19 | g | 12.7 | g | 5.67 | g | 6.0 | g | 6.9 | g |
| cyclohexane carboxylic acid ethyl ester | 2.27 | g | 48.0 | g | 3.8 | g | 8.5 | g | 5.7 | g |
| cyclodecane carboxylic acid ethyl ester | 13.96 | g | 19.8 | g | 4.3 | g | 4.5 | g | 2.0 | g |
| undecane acid ethyl ester | 6.89 | g | 16.6 | g | 3.8 | g | 10.3 | g | 1.8 | g |
| diester mixture | 60.1 | g | 192.8 | g | 57.5 | g | 81.0 | g | 74.9 | g |
| consists of | | | | | | | | | | |
| n-diester | 9.2 | % | 16.4 | % | 10.2 | % | 15.5 | % | 6.5 | % |
| i-diester | 90.8 | % | 83.6 | % | 90.8 | % | 84.5 | % | 93.5 | % |
| ACE conversion based thereon | 77.6 | % | 68.6 | % | 54.8 | % | 64.6 | % | 50.0 | % |
| Yield of the diester mixture | 61.7 | % | 57.6 | % | 65.2 | % | 39.0 | % | 47.8 | % |

EXAMPLES 7 – 10

Influence of the donor upon diester formation

| Example No. | 7 | | 8 | | 9 | | 10 | |
|---|---|---|---|---|---|---|---|---|
| Temperature [°C] | 80–100 | | 80 | | 100 | | 80–100 | |
| Time [h] | 21 | | 20 | | 3:45 | | 5:30 | |
| reaction mixture | | | | | | | | |
| Ni(COD)$_2$ | 2.0 | g | 2.0 | g | 5.0 | g | 2.0 | g |
| Donor | 2.1 | g[+) | 1.9 | g[+) | 4.8 | g[+) | 1.9 | g[+) |
| ACE | 76.2 | g | 73.5 | g | 184.0 | g | 104.3 | g |
| BD | 59.0 | g | 57.0 | g | 142.0 | g | 57.0 | g |
| ACE:BD ratio | 0.7 | | 0.7 | | 0.7 | | 0.98 | |
| reaction products | | | | | | | | |
| cyclooctane | 20.2 | g | 6.6 | g | 15.6 | g | 5.0 | g |
| cyclohexane carboxylic acid ethyl ester | 5.3 | g | 6.4 | g | 29.0 | g | 14.1 | g |
| cyclodecane carboxylic acid ethyl ester | traces | | 1.8 | g | 3.5 | g | traces | |
| undecane acid ethyl ester | 8.5 | g | 9.2 | g | 38.9 | g | 24.6 | g |
| diester mixture | 23.8 | g | 59.6 | g | 169.4 | g | 28.9 | g |
| consists of | | | | | | | | |
| n-diester | 9.9 | % | 15.6 | % | not | determined | | |
| i-diester | 90.1 | % | 84.4 | % | do | do. | | |
| ACE conversion based thereon | 99.5 | % | 98.3 | % | 94.8 | % | 58.6 | % |
| Yield of the diester mixture | 20.2 | % | 54.8 | % | 61.9 | % | 30.1 | % |

*) tricyclohexyl phosphine
(+) triphenylphosphine.

EXAMPLES 11 – 14

Influence of the donor upon diester formation

| Example No. | 11 | | 12 | | 13 | | 14 | |
|---|---|---|---|---|---|---|---|---|
| Temperature [°C] | 120 | | 80–120 | | 80–100 | | 80–120 | |
| Time [h] | 41 | | 49 | | 38 | | 76:30 | |
| reaction mixture | | | | | | | | |
| Ni(COD)$_2$ | 2.2 | g | 3.8 | g | 2.0 | g | 4.0 | g |
| Donor | 1.3 | g[+) | 1.6 | g[+) | 0.4 | g[+) | 0.85 | g[+) |
| ACE | 75.9 | g | 80.0 | g | 75.0 | g | 115.0 | g |
| BD | 59.0 | g | 62.6 | g | 57.5 | g | 118.0 | g |
| ACE:BD ratio | 0.7 | | 0.7 | | 0.7 | | 0.71 | |
| reaction products | | | | | | | | |
| cyclooctane | 15.9 | g | 9.5 | g | 2.6 | g | 4.9 | g |
| cyclohexane carboxylic acid ethyl ester | 20.1 | g | 18.5 | g | 81.8 | g | 167.7 | g |
| cyclodecane carboxylic acid ethyl ester | traces | | traces | | 0.7 | g | traces | |
| undecane acid ethyl ester | 12.1 | g | 6.0 | g | 5.4 | g | 4.8 | g |
| diester mixture | 14.8 | g | 12.8 | g | 15.3 | g | 13.1 | g |

| Example No. | 11 | | 12 | | 13 | | 14 | |
|---|---|---|---|---|---|---|---|---|
| consists of | | | | | | | | |
| n-diester | not determined | | 8.8 | % | not determined | | 65.9 | % |
| i-diester | do. | | 91.2 | % | do. | | 34.1 | % |
| ACE conversion based thereon | 94.8 | % | 93.7 | % | 92.5 | % | 91.8 | % |
| Yield of the diester mixture | 13.1 | % | 10.9 | % | 14.0 | % | 5.9 | % |
| | +)triiso-propyl-phosphine | | considerable quantity of polymer as residue +)pyridine | | +)dithiane | | +)tri-ethylene diamine | |

EXAMPLES 15–18

Influence of the donor upon diester formation to +80° C. and left for 10.4 hours at the pressure attained.

| Example No. | 15 | | 16 | | 17 | | 18 | |
|---|---|---|---|---|---|---|---|---|
| Temperature [°C] | 80 | | 80–100 | | 80–100 | | 80–100 | |
| Time [h] | 7 | | 55 | | 92 | | 65 | |
| reaction mixture | | | | | | | | |
| Ni(COD)₂ | 5.1 | g+) | 2.1 | g | 9.1 | g+) | 1.7 | g+) |
| Donor | 7.8 | g+) | — | | 13.4 | g+) | 1.9 | g+) |
| ACE | 187.0 | g | 76.0 | g | 188.0 | g | 62.8 | g |
| BD | 147.5 | g | 59.0 | g | 147.0 | g | 49.2 | g |
| ACE:BD ratio | 0.68 | | 0.7 | | 0.7 | | 0.7 | |
| reaction products | | | | | | | | |
| cyclooctane | 24.1 | g | 4.7 | g | 8.3 | g | 1.3 | g |
| cyclohexane carboxylic acid ethyl ester | 11.9 | g | 23.8 | g | 192.9 | g | 8.9 | g |
| cyclodecane carboxylic acid ethyl ester | 20.9 | g | traces | | 24.5 | g | 3.8 | g |
| undecane acid ethyl ester | 26.1 | g | 0.6 | g | 4.5 | g | 4.7 | g |
| diester mixture | 168.5 | g | 36.1 | g | 8.9 | g | 32.9 | g |
| consists of | | | | | | | | |
| n-diester | 7.89 | % | | | not determined | | | |
| i-diester | 92.2 | % | | | do. | | | |
| ACE conversion based thereon | 77.7 | % | 94.1 | % | 97.4 | % | 97.0 | % |
| Yield of the diester mixture | 73.9 | % | 32.2 | % | 3.1 | % | 34.0 | % |
| | +)tri-(o-methoxy-phenyl)-phosphite | | considerable quantity of higher oligomers in the residue | | +)tri-(o-phenoxy phenyl)-phosphite | | +)arsenic tri-phenyl | |

EXAMPLE 19

As described in Example 1, 5.6 g of nickel acetyl acetonate and 11.7 g of tri-(o-phenylphenyl)-phosphite dissolved in 93.3 g of toluene, are reacted at −20° C. in the presence of 11.4 g of butadiene by the addition of 2.5 g of alluminum triethyl. The reaction mixture is heated to +20° C. and introduced into an autoclave filled beforehand with 100 g of ethyl acrylate and 78.2 g of 1,3-butadiene. The reaction mixture is the heated After working up by hydrogenation in the usual way, 31.7 g of cyclooctane, 3.2 g of cyclohexane carboxylic acid ethyl ester, 31.5 g of cyclodecane carboxylic acid ester, 15.5 g of undecane acid ethyl ester and 59.2 g of diester mixture as in Example 1 are obtained.

The ethyl acrylate conversion is 64.2 percent and the diester yield based thereon is 58.7 percent.

EXAMPLES 20–24

Influence of the reaction time on the diester yield

| Example No. | 20 | | 21 | | 22 | | 23 | | 24 | |
|---|---|---|---|---|---|---|---|---|---|---|
| Temperature [°C] | 80 | | 80 | | 80 | | 80 | | 80 | |
| Time [h] | ½ | | 1 | | 2½ | | 3⁴⁵ | | 7 | |
| reaction mixture | | | | | | | | | | |
| Ni(COD)₂ | 9.6 | g | 9.6 | g | 9.6 | g | 3.8 | g | 110.0 | g |
| TPPP | 18.9 | g | 18.9 | g | 18.9 | g | 7.5 | g | 216.0 | g |
| ACE | 200.0 | g | 200.0 | g | 200.0 | g | 80.0 | g | 4320.0 | g |
| BD | 108.0 | g | 108.0 | g | 108.0 | g | 43.2 | g | 2338.0 | g |
| ACE:BD ratio | 1 | | 1 | | 1 | | 1 | | 1 | |
| reaction products | | | | | | | | | | |
| cyclooctane | 13.0 | g | 13.0 | g | 21.0 | g | 4.6 | g | 305.0 | g |
| cyclohexane carboxylic acid ethyl ester | 4.6 | g | 3.0 | g | 5.5 | g | 2.2 | g | 324.0 | g |
| cyclodecane carboxylic acid ethyl ester | 23.7 | g | 20.1 | g | 29.0 | g | 14.0 | g | 257.0 | g |

Continued

| Example No. | 20 | | 21 | | 22 | | 23 | | 24 | |
|---|---|---|---|---|---|---|---|---|---|---|
| undecane acid ethyl ester | 16.7 | g | 21.7 | g | 22.0 | g | 6.5 | g | 914.0 | g |
| diester mixture consists of | 74.1 | g | 93.9 | g | 103.0 | g | 43.0 | g | 2938.0 | g |
| n-diester | 6.0 | % | 8.1 | % | 14.7 | % | 6.6 | % | 16.0 | % |
| i-diester | 94.0 | % | 91.9 | % | 85.3 | % | 93.4 | % | 84.0 | % |
| ACE conversion based thereon | 46.0 | % | 50.0 | % | 70.0 | % | 70.0 | % | 67.0 | % |
| Yield of the diester mixture | 50.0 | % | 59.0 | % | 47.0 | % | 49.0 | % | 65.0 | % |

EXAMPLES 25–28

Influence of the reaction time on the diester yield

| Example No. | 25 | | 26 | | 27 | | 28 | |
|---|---|---|---|---|---|---|---|---|
| Temperature [°C] | 80 | | 80 | | 80 | | 80 | |
| Time [h] | 7½ | | 13 | | 21½ | | 25 | |
| reaction mixture | | | | | | | | |
| Ni(COD)$_2$ | 9.6 | g | 3.8 | g | 9.6 | g | 9.6 | g |
| TPPP | 18.9 | g | 7.5 | g | 18.9 | g | 18.9 | g |
| ACE | 200.0 | g | 80.0 | g | 200.0 | g | 200.0 | g |
| BD | 108.0 | g | 43.2 | g | 108.0 | g | 108.0 | g |
| ACE:BD ratio | 1 | | 1 | | 1 | | 1 | |
| reaction products | | | | | | | | |
| cyclohexane carboxlic acid ethyl ester | 9.0 | g | 3.2 | g | 4.5 | g | 8.8 | g |
| cyclooctane | 15.9 | g | 7.6 | g | 12.9 | g | 21.9 | g |
| cyclodecane carboxylic acid ethyl ester | 30.0 | g | 10.7 | g | 26.0 | g | 32.9 | g |
| undecane acid ethyl diester mixture | 25.2 | g | 14.1 | g | 15.6 | g | 21.6 | g |
| | 128.0 | g | 42.7 | g | 120.0 | g | 124.9 | g |
| consists of | | | | | | | | |
| n-diester | 6.3 | %g | 8.7 | %g | 7.2 | %g | 10.0 | % |
| i-diester | 93.7 | % | 91.3 | % | 92.8 | % | 90.0 | % |
| ACE conversion based thereon | 82.0 | % | 69.0 | % | 71.0 | % | 70.0 | % |
| Yield of the diester mixture | 51.0 | % | 54.0 | % | 53.0 | % | 58.0 | % |

EXAMPLE 29

Hydrolysis of the diester mixture into the diacid.

112 g of KOH and 500 ml of ethanol are brought to the boil while stirring. 160 g of diester mixture are then added dropwise over a period of 1 hour and the resulting reaction mixture is kept under reflux for 15 hours. Most of the alcohol is distilled off. The disodium salts of the diacids precipitated is filtered off, suspended in water and acidified. The free diacids accumulate in a layer and are separated from the aqueous phase by repeated extraction with ether. Following removal of the ether, a mixture of the diacids is left behind in the form of a semi-crystalline viscous mass. Investigations by $^1$H-NMR spectroscopy show that the mixture is in fact a mixture of n-diacid and iso diacid, without any unhydrolysed diester components. Diacid is obtained in a yield of 120 g or 93 percent of the theoretical.

The 220 mc/s spectrum of the mixture of n- and iso-diacid recorded in deuteromethanol shows the following pattern: a multiplet signal appears at 2.29 ppm, being attributed to the methylene groups in the α- and α'-positions to the carbonyl group. This applies both to the n- and to the i-diacid. A poorly defined signal appears at 1.61 ppm, being attributed to the corresponding β- and β'-methylene group of the two dicarboxylic acids. The residual methylene groups of the chain of both acids and the methylene groups of the ethyl radical and the methine proton of the i-diacid absorb at 1.32 ppm, in the form of a wide signal without any further fine structure. The methyl triplet of the branching of the i-diacid appears as expected at the maximum field (0.87 ppm).

The n- and i-diacid component is quantitatively determined through this signal as the basis integral value. 90 percent of i-diacid and 10 percent of n-diacid are found.

EXAMPLES 30–32

Influence of the reaction temperature upon the diester yield

| Example No. | 30 | | 31 | | 32 | |
|---|---|---|---|---|---|---|
| Temperature [°C] | 100 | | 100 | | 120 | |
| Time [h] | 5$^{30}$ | | 11 | | 5$^{30}$ | |
| reaction mixture | | | | | | |
| Ni(COD)$_2$ | 9.6 | g | 9.6 | g | 9.6 | g |
| TPPP | 18.8 | g | 18.8 | g | 18.9 | g |
| ACE | 200.0 | g | 200.0 | g | 200.0 | g |
| BD | 108.0 | g | 108.0 | g | 108.0 | g |
| ACE:BD ratio | 1 | | 1 | | 1 | |
| reaction products | | | | | | |
| cyclooctane | 17.5 | g | 15.9 | g | 15.5 | g |

Continued

| Example No. | 30 | | 31 | | 32 | |
|---|---|---|---|---|---|---|
| cyclohexane carboxylic acid ethyl ester | 7.7 | g | 25.0 | g | 14.0 | g |
| cyclodecane carboxylic acid ethyl ester | 27.5 | g | 3.1 | g | 10.2 | g |
| undecane acid ethyl ester | 46.0 | g | 64.6 | g | 61.6 | g |
| diester mixture | 95.0 | g | 81.7 | g | 92.8 | g |
| consists of | | | | | | |
| n-diester | 15.1 | % | 16.9 | % | 14.5 | % |
| i-diester | 84.9 | % | 83.1 | % | 85.5 | % |
| ACE conversion based thereon | 65.0 | % | 67.0 | % | 68.0 | % |
| Yield of the diester mixture | 46.5 | % | 41.0 | % | 43.0 | % |

EXAMPLES 33–35

Influence of the reaction temperature on the diester yield

| Example No. | 33 | | 34 | | 35 | |
|---|---|---|---|---|---|---|
| Temperature [°C] | 120 | | 160 | | 160 | |
| Time [h] | 11 | | 5[30] | | 11 | |
| reaction mixture | | | | | | |
| Ni(COD)$_2$ | 9.6 | g | 9.6 | g | 9.6 | g |
| TPPP | 18.9 | g | 18.9 | g | 18.9 | g |
| ACE | 200.0 | g | 200.0 | g | 200.0 | g |
| BD | 108.0 | g | 108.0 | g | 108.0 | g |
| ACE:BD ratio | 1 | | 1 | | 1 | |
| reaction products | | | | | | |
| cyclooctane | 21.1 | g | 16.9 | g | 19.5 | g |
| cyclohexane carboxylic acid ethyl ester | 10.2 | g | 46.5 | g | 9.5 | g |
| cyclodecane carboxylic acid ethyl ester | 7.0 | g | 1.5 | g | 21.0 | g |
| undecane acid ethyl ester | 60.2 | g | 69.5 | g | 35.0 | g |
| diester mixture | 122.3 | g | 49.9 | g | 112.3 | g |
| consists of | | | | | | |
| n-diester | 10.7 | % | 21.0 | % | 12.7 | % |
| i-diester | 89.3 | % | 79.0 | % | 87.3 | % |
| ACE conversion based thereon | 68.5 | % | 75.0 | % | 72.0 | % |
| Yield of the diester mixture | 57.0 | % | 21.0 | % | 50.0 | % |

EXAMPLES 36–38

Reaction of other α, β- unsaturated compounds and other acrylic esters with 1,3-butadiene in accordance with Example 1.

| Example No. | 36 | | 37 | | 38 | |
|---|---|---|---|---|---|---|
| Temperature [°C] | 100 | | 100 | | 100 | |
| Time [h] | 20 | | 20 | | 20 | |
| reaction mixture | | | | | | |
| Ni(COD)$_2$ | 5.5 | g | 5.5 | g | 9.6 | g |
| TPPP | 10.76 | g | 10.76 | g | 18.9 | g |
| α, β-unsaturated compound | 172.2 | g[+)] | 200.0 | g[+)] | 256.0 | g[+)] |
| BD | 108.0 | g | 108.0 | g | 108.0 | g |
| | [+)] ethyl acrylate | | [+)] methyl methacrylate | | [+)] butyl-acrylate | |
| Ratio of the α, β-unsaturated compound to BD | 1 | | 1 | | 1 | |
| α, β-unsaturated compound conversion | 70 | % | 60 | % | 55 | % |
| diester mixture yield based thereon | 53 | % | 58 | % | 46 | % |
| the following molecular masses were determined for the new diesters by mass spectrometry | 286 | | 314 | | 370 | |

EXAMPLE 39

6.6 g of bis-(1,5-cyclooctadiene)-nickel-(0) and 13.8 g of tri-(o-phenylphenyl)-phosphite are dissolved in 241 g of ethyl acrylate as described in Example 1. The reaction mixture is heated to 20° C. and introduced into an autoclave filled with 130 g of butadiene. The reaction mixture is then heated to 80° C. and left standing for 7 hours under the pressure which is is automatically attained.

In order to isolate the tri-unsaturated diester formed, the reaction mixture accumulating on completion of the reaction is worked up under reduced pressure by means of a falling-film evaporator. The first runnings are removed up to 130°C./3 Torr, and the unsaturated diesters (with a purity of around 45%) are separated off from the sump obtained at 220°C./1 Torr in a single throughput. Redistillation at 160°C./3 Torr gives 80 percent of diester in the sump.

The ethyl acrylate conversion is approximately 65 percent and the yield of unsaturated diester based thereon is greater than 40 percent.

After the isolated diester has been hydrogenated in the usual way, n-tetradecane diacid diethyl ester and 4-ethyl dodecane diacid diethyl ester are obtained in the quantitative ratio specified in Example 1.

What we claim is:

1. A process for the production of dicarboxylic acid esters and the corresponding dicarboxylic acids by reacting diolefins with $\alpha, \beta$-unsaturated compounds in the presence of catalysts, wherein 1 mol of a compound corresponding to the general formula

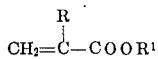

in which R represents hydrogen or a methyl group and $R^1$ represents hydrogen or a linear or branched lower alkyl radical is reacted with at most 1.95 mols of butadiene in the presence of a nickel catalyst which contains nickel in an oxidation state of less than +2 and which can be modified by donors, or nickel tetracarbonyl at a temperature in the range from about 50° to about 160°C, the unsaturated compounds formed are hydrogenated optionally without being isolated 2. A process as claimed in claim 1 wherein the reaction is carried out at a temperature in the range from 70° to 100°C.

3. A process for the production of dicarboxylic acid esters and the corresponding dicarboxylic acids by reacting diolefins with $\alpha, \beta$-unsaturated compounds in the presence of catalysts, wherein 1 mol of a compound corresponding to the general formula

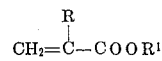

in which R represents hydrogen or a methyl group and $R^1$ represents a linear or branched lower alkyl radical is reacted with at most 1.95 mols of butadiene in the presence of a nickel catalyst which contains nickel in an oxidation state of less than +2 and which can be modified by donors, or nickel tetracarbonyl at a temperature in the range of from about 50° to about 160°C, the unsaturated compounds formed are isolated and hydrogenated and the isolated hydrogenated compounds are hydrolized to form the saturated dicarboxylic acids.

* * * * *

UNITED STATES PATENT OFFICE
CERTIFICATE OF CORRECTION

Patent No. __3,853,961__    Dated __December 10, 1974__

Inventor(s) __Udo Birkenstock et al.__

It is certified that error appears in the above-identified patent and that said Letters Patent are hereby corrected as shown below:

Column 1, line 58 "open" should read --Open--;

Column 2, line 21 "Unbranched" should read --Branched--;

Column 2, line 56 "0.05" should read --0.5--;

Column 6, (ACE Example 14) "115.0" should read --155.0--;

Column 6, (cyclohexane, etc., Example 14) "167.7"

should read --161.7--;

Column 6, (Donor Example 15) "7.8" should read --7.5--;

Column 7, line 51 "alluminum" should read --aluminum--;

Column 9 (Cyclodecane, etc., Example 15) "30.0"

should read --30.9--;

Signed and sealed this 29th day of April 1975.

(SEAL)
Attest:

RUTH C. MASON
Attesting Officer

C. MARSHALL DANN
Commissioner of Patents
and Trademarks